United States Patent [19]

Brookbank, III

[11] Patent Number: 4,681,169
[45] Date of Patent: Jul. 21, 1987

[54] APPARATUS AND METHOD FOR SUPPLYING ELECTRIC POWER TO CABLE SUSPENDED SUBMERGIBLE PUMPS

[75] Inventor: Earl B. Brookbank, III, Bartlesville, Okla.

[73] Assignee: TRW, Inc., Cleveland, Ohio

[21] Appl. No.: 881,245

[22] Filed: Jul. 2, 1986

[51] Int. Cl.[4] .................. E21B 41/00; E21B 19/00; H02G 1/00; H01B 7/18
[52] U.S. Cl. .................. 166/385; 29/728; 166/65.1; 166/77; 174/70 R; 174/97; 174/103
[58] Field of Search ............. 174/70 R, 70 C, 97, 174/103, 136; 29/728, 820; 156/54, 55; 166/65.1, 77, 241, 242, 379, 380, 385

[56] References Cited

U.S. PATENT DOCUMENTS

| | | | |
|---|---|---|---|
| 310,938 | 1/1885 | Gilliland | 174/41 |
| 2,043,044 | 6/1936 | Knoderer | 174/103 X |
| 2,942,314 | 6/1960 | Debner et al. | 24/129 R |
| 3,404,217 | 10/1968 | Kelly | 174/103 |
| 3,422,214 | 1/1969 | Kelly | 174/103 |
| 3,430,337 | 3/1969 | Kelly | 174/103 X |
| 3,745,230 | 7/1973 | Kelly | 174/103 |
| 3,846,575 | 11/1974 | Troy | 174/41 |
| 4,406,042 | 9/1983 | McPhee | 24/130 |
| 4,585,066 | 4/1986 | Moore et al. | 166/385 |

FOREIGN PATENT DOCUMENTS 2439350  5/1980  France ................ 248/68.1

Primary Examiner—Laramie E. Askin
Attorney, Agent, or Firm—Shapiro and Shapiro

[57] ABSTRACT

Electric power is supplied to downhole equipment, such as a submergible pump, by a power cable that is joined to a support cable by a cable carrier as the carrier and cables are fed into a well. The carrier comprises laterally displaced resilient clamping sections that are clamped about respective cables to form a continuous assembly, and the assembly is fed into the well as the equipment is installed.

7 Claims, 9 Drawing Figures

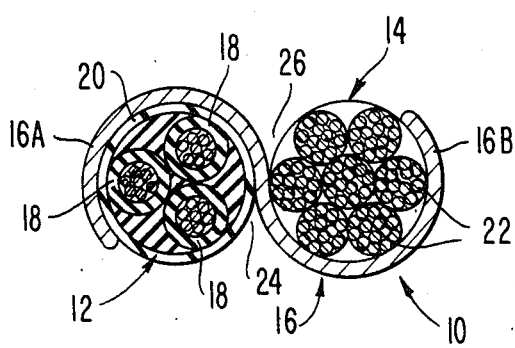
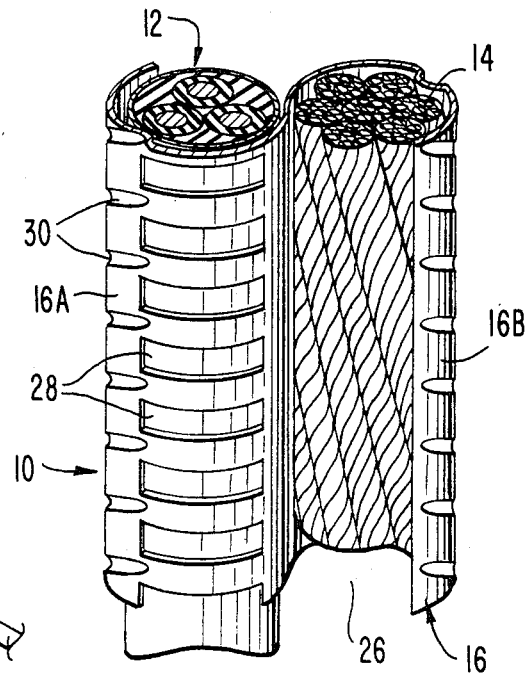
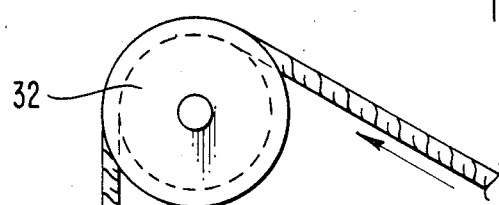
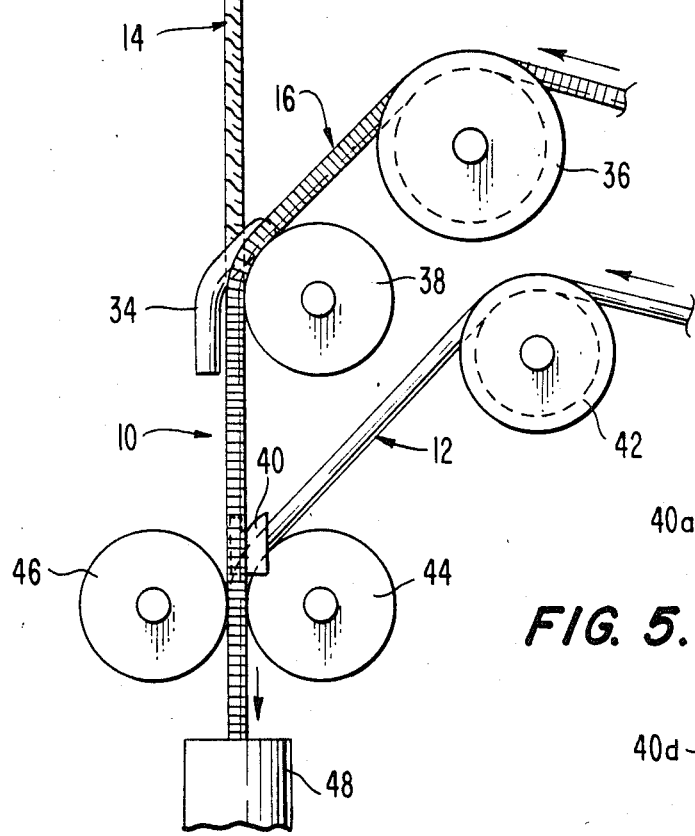
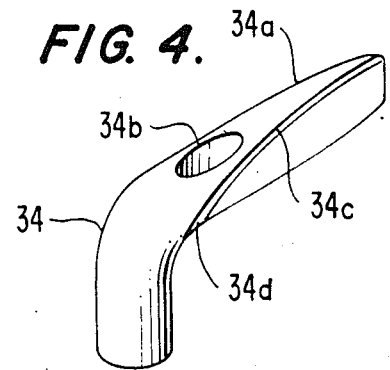
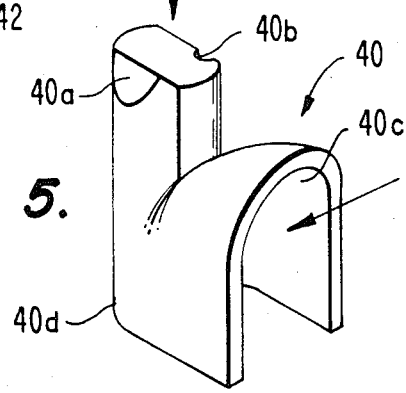

APPARATUS AND METHOD FOR SUPPLYING ELECTRIC POWER TO CABLE SUSPENDED SUBMERGIBLE PUMPS

BACKGROUND OF THE INVENTION

This invention is concerned with supplying electric power to electrically energized equipment, such as cable suspended submergible pumps and the like.

In cable suspended pumping systems, such as those disclosed in U.S. Pat. No. 3,411,454, issued Nov. 19, 1968, U.S. Pat. No. 3,468,258, issued Sept. 23, 1969, and U.S. Pat. No. 3,672,795, issued June 27, 1972, all assigned to the assignee of the present invention, electric power is supplied to the motor of a submergible pump by an electrical cable that includes weight-bearing cable members or that is periodically strapped by bands to an adjacent separate support cable. In the former arrangement the thermal properties of the electrical cable interact with the mechanical properties of the weight-bearing components as well as the external armor, so that increasing temperature applies damaging compressive stresses to the copper current-carrying conductors. In the latter arrangement the band strapping operation requires that the cables be fed into the well intermittently so that the cables are stationary while the bands are applied. This is a cumbersome operation.

BRIEF DESCRIPTION OF THE INVENTION

The present invention provides an improved method of attaching a power cable to a support cable as both cables are fed into a well and provides an improved cable assembly. In one of its broader aspects, the invention is concerned with a method of supporting and electrically energizing equipment in a well, that comprises providing a continuous length of electrical power cable, providing a continuous length of support cable, providing a continuous length of cable carrier, feeding said continuous lengths toward the well, continuously joining said cable carrier with said power cable and with said support cable to form a unitary assembly as said lengths are advanced toward said well, and feeding said unitary assembly into said well.

In another of its broader aspects, the invention is concerned with a cable assembly comprising a continuous length of electrical power cable, a continuous length of support cable, and a continuous length of cable carrier substantially coextensive longitudinally with said cables, said cable carrier comprising two laterally displaced resilient clamping sections open at opposite sides of the carrier, one of said sections resiliently embracing one of said cables and the other of said sections resiliently embracing the other of said cables.

BRIEF DESCRIPTION OF THE DRAWINGS

The invention will be further described in conjunction with the accompanying drawings, which illustrate preferred (best mode) embodiments, and wherein:

FIG. 1 is a transverse sectional view of a cable assembly in accordance with the invention;

FIG. 2 is a fragmentary, partly sectional perspective view of the assembly of FIG. 1;

FIG. 3 is a somewhat diagrammatic side elevation view illustrating the manner in which the assembly of FIGS. 1 and 2 is formed;

FIGS. 4 and 5 are perspective views of cable horns that may be employed in the invention.

DETAILED DESCRIPTION OF THE INVENTION

Figure 6:
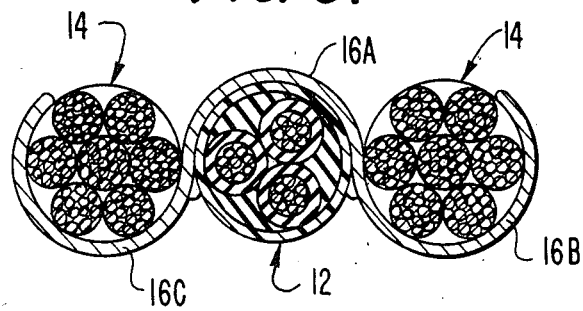
FIGS. 6-9 are views similar to FIG. 1 but illustrating modifications of the invention.

As shown in FIGS. 1 and 2, a cable assembly 10 in accordance with the invention comprises an electrical power cable 12 and a support cable 14 joined by a cable carrier 16. The power cable may be a conventional type comprising a plurality of insulated current-carrying conductors 18 appropriately supported in an outer sheath 20, which may be armored. The support cable 14 may be a conventional type including helically twisted bundles of steel wire 22. In the form shown, the cable carrier 16 comprises laterally displaced resilient clamping sections 16A, 16B formed from a continuous strip of metal. The cable carrier has an S-shaped cross-section providing openings 24 and 26 at opposite sides thereof. The clamping sections 16A, 16B, may be spread to enlarge the openings 24 and 26 to permit the insertion of cables 12 and 14 into the clamping sections laterally. To provide additional bending flexibility in planes normal to axial planes and to reduce weight, the cable carrier sheet material may be slotted as shown at 28. The carrier may be embossed as shown at 30 to provide better spring tension for gripping various cables.

A preferred method for forming the assembly 10 is illustrated in FIG. 3. Continuous lengths of the cables 12 and 14 and the carrier 16 are fed (as indicated by the arrows) from drums, for example (not shown). Support cable 14 passes over a crown sheave 32 and then moves downwardly to a cable horn 34. The carrier 16 passes over an idler sheave 36 and is then advanced to the cable horn 34, passing between the cable horn and a backing roller 38 (which may have an appropriate concave outer contour). Wedge portion 34a of the cable horn (FIG. 4) spreads the clamping section 16B, so that the support cable 14, which passes through a hole 34b in the cable horn, may enter section 16B through opening 26. A groove 34c may be provided on the surface of the cable horn to engage an edge of the carrier 16B and help guide the carrier along the cable horn. As the continuously advanced support cable 14 and cable carrier 16 move downwardly past the cable horn 34 and the backing wheel 38, the cable horn releases the spreading of section 16B at 34d so that the clamping section closes about the cable 14 and embraces it resiliently.

The assembled cable 14 and cable carrier 16 move downwardly to a further cable horn 40, wedge portion 40a of which (FIG. 5) spreads clamping section 16A, so that it may receive power cable 12 therein in the same manner that clamping section 16B received the support cable 14. A groove 40b may be provided on the surface of the cable horn to engage an edge of the carrier section 16A and help guide the carrier along the cable horn. The power cable 12 is continuously fed to the cable horn 40 over an idler sheave 42. A backing roller 44 assists in feeding the cable 12 into a slot 40c of the cable horn 40. A guide roller 46 may also be provided opposite to roller 44. Both rollers 44 and 46 may have appropriate concave outer contours. The substantially longitudinally coextensive assembly of cables 12 and 14 and cable carrier 16 is then fed continuously into a wellhead 48 of a well (not shown).

A submergible pumping unit (not shown) is attached to the lower end of the cables 12 and 14 in a conventional manner (for electrical energization and support) and is lowered into the well suspended by the cable 14.

When the submergible pumping unit is retrieved from the well, the installation operation shown in FIG. 3 may be reversed to separate the parts of the assembly. The method illustrated in FIG. 3 may be modified so that the carrier 16 is assembled first with the power cable and then with the support cable. Also, the assembly may be formed more remote from the wellhead, and then the preformed assembly may be lowered into the well.

Figure 7:
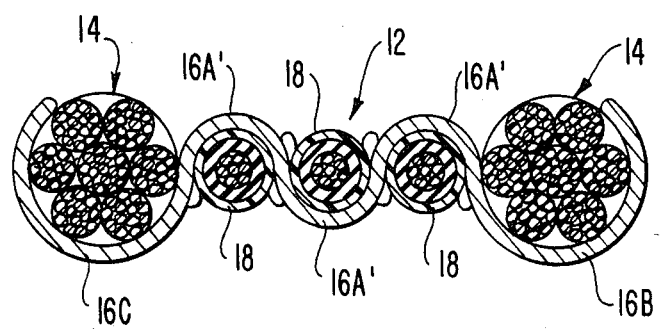
Figure 8:
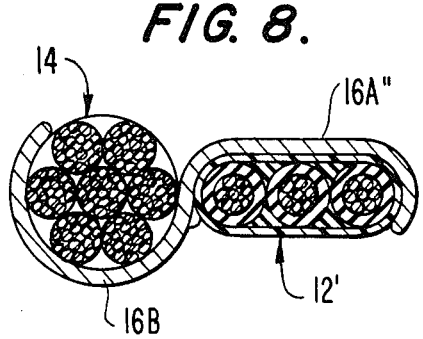
Figure 9:
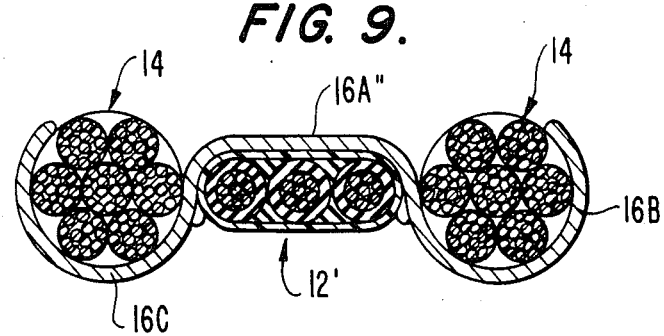

FIGS. 6–9 illustrate modifications of the cable assembly. In FIGS. 6, 7 and 9, two support cables 14 are used, the cables being disposed at opposite sides of a power cable 12. In these embodiments the cable carrier is provided with an additional clamping section 16C to embrace the additional support cable 14, sections 16A, 16A' and 16A" constituting intermediate sections in these embodiments. In FIG. 7 the insulated conductors 18 of the power cable 12 are separate members, and each is embraced in an individual resilient carrier subsection 16A'. In FIGS. 8 and 9, the cable carrier is constructed to support a flat power cable 12'. As is apparent, this requires flattening of clamping section 16A".

By virtue of the invention, cable suspended submergible pumps and the like can be installed continuously without the need for stopping the installation operation in order to strap a power cable to a support cable by discrete bands. Since the weight bearing components are not integrated with the electrical power cable, the thermal properties of the electrical power cable do not affect the support cable, and thermal expansion does not apply compressive stresses to the copper conductors of the electrical cable. The individual power and support cables may be tailored to the conditions in each well. For example, a low cost power cable and a low cost support cable may be used in a low temperature well having a benign environment, and more expensive cables may be used in high temperature wells having a hostile environment.

A conventional unitary power-support cable for a cable suspended pumping system weights approximately 4–5 lbs. per foot. In an oil well that is 8,000 to 10,000 feet deep, for example, the required cable may weigh from 35,000 to 45,000 lbs., creating transportation and handling problems, particularly where the cables must be used in hostile environments, such as in the jungle or arctic regions. By virtue of the invention, the three parts of the cable assembly may be transported and handled separately, which clearly can be advantageous.

While preferred embodiments of the invention have been shown and described, it will be apparent to those skilled in the art that changes can be made without departing from the principles and spirit of the invention, the scope of which is defined in the appended claims.

What is claimed is:

1. A method of supporting and electrically energizing equipment in a well, that comprises providing a continuous length of electrical power cable, providing a continuous length of support cable, providing a continuous length of cable carrier, feeding said continuous lengths toward the well, continuously joining said cable carrier with said power cable and with said support cable to form a unitary assembly as said lengths are advanced toward said well, and feeding said unitary assembly into said well.

2. A method in accordance with claim 1, wherein said carrier is provided with laterally displaced clamping sections and wherein said joining of said carrier to said cables comprises clamping one section about said power cable and another section about said support cable.

3. A method in accordance with claim 2, wherein said clamping sections are resilient and each has an opening at one side thereof, and wherein said joining comprises spreading each resilient section, inserting a cable therein through the opening thereof, and releasing the spreading of the section so that the section embraces the inserted cable resiliently.

4. A method in accordance with claim 2, wherein one of said sections is open at one side of said carrier and the other of said sections is open at the opposite side of said carrier, and wherein said joining comprises spreading said sections, inserting respective cables therein through the open sides thereof, and releasing the spreading so that said sections embrace said cables resiliently.

5. A cable assembly comprising a continuous length of electrical power cable, a continuous length of support cable, and a continous length of cable carrier substantially coextensive longitudinally with said cables, said cable carrier comprising two laterally displaced resilient clamping sections open at opposite sides of the carrier, one of said sections resiliently embracing one of said cables and the other of said sections resiliently embracing the other of said cables.

6. A cable assembly in accordance with claim 5, including a pair of support cables displaced laterally at opposite sides of a power cable and wherein said cable carrier has a pair of sections embracing said support cables and an intermediate section embracing said power cable.

7. A cable assembly in accordance with claim 6, wherein said power cable comprises a plurality of laterally displaced insulated conductors, each of which is embraced in a subsection of said intermediate section.

* * * * *